(12) United States Patent
Christopher et al.

(10) Patent No.: US 8,897,544 B2
(45) Date of Patent: Nov. 25, 2014

(54) SYSTEM AND METHOD FOR SEGMENTATION OF THREE-DIMENSIONAL IMAGE DATA

(75) Inventors: Lauren A. Christopher, Indianapolis, IN (US); Yan Sun, Indianapolis, IN (US)

(73) Assignee: Indiana University Research and Technology Corp., Indianapolis, IN (US)

( * ) Notice: Subject to any disclaimer, the term of this patent is extended or adjusted under 35 U.S.C. 154(b) by 196 days.

(21) Appl. No.: 13/514,768

(22) PCT Filed: Dec. 10, 2010

(86) PCT No.: PCT/US2010/059955
§ 371 (c)(1),
(2), (4) Date: Jun. 8, 2012

(87) PCT Pub. No.: WO2011/072259
PCT Pub. Date: Jun. 16, 2011

(65) Prior Publication Data
US 2012/0243777 A1 Sep. 27, 2012

Related U.S. Application Data

(60) Provisional application No. 61/285,429, filed on Dec. 10, 2009.

(51) Int. Cl.
*G06K 9/46* (2006.01)
*G06K 9/62* (2006.01)
*G06T 1/20* (2006.01)
*G06T 7/00* (2006.01)

(52) U.S. Cl.
CPC .............. *G06K 9/6278* (2013.01); *G06T 1/20* (2013.01); *G06T 7/0081* (2013.01); *G06T 7/0087* (2013.01)
USPC .......................................... 382/154; 382/195

(58) Field of Classification Search
CPC ............. G06K 9/00; G06K 9/64; G06K 9/34; G06T 7/0081; G06T 7/0087; G06T 7/0014; G06T 2207/30004; G06T 2207/20141; G06T 2204/10104; G06T 2207/10081; G06T 2207/10116; G06T 5/00; G06T 7/0048; G06T 7/0079
USPC ......... 382/181, 190, 195, 205, 172, 168, 276, 382/284, 254, 270, 232, 237, 252, 251, 141, 382/149, 100, 145, 147, 154; 358/500, 518, 358/530, 534, 1.1, 1.9, 400, 406, 443, 448, 358/461, 3.01, 3.06, 3.03, 471; 345/418, 345/419; 348/739, 744, 759, 760, 761
See application file for complete search history.

(56) References Cited

U.S. PATENT DOCUMENTS 6,185,336 B1 * 2/2001 Clark et al. ................... 382/224
6,222,935 B1 * 4/2001 Okamoto ...................... 382/149

(Continued)

OTHER PUBLICATIONS

International Search Report and Written Opinion of the International Searching Authority corresponding to PCT Application No. PCT/US2010/059955, Alexandria, Virginia, USA, Feb. 7, 2011 (7 pages).

(Continued)

*Primary Examiner* — Sheela Chawan
(74) *Attorney, Agent, or Firm* — Maginot Moore & Beck LLP

(57) ABSTRACT

In one embodiment, a system for computing class identifiers for three-dimensional pixel data has been developed. The system comprises a plurality of class identifying processors, and a data grouper operatively connected to a first memory. Each class identifying processor has a plurality of inputs for at least one pixel value and a plurality of class identifiers for pixel values neighboring the at least one pixel value and each class identifying processor is configured to generate a class identifier for the at least one pixel value input with reference to the class identifiers for the neighboring pixel values. The data grouper is configured to retrieve a plurality of pixel values from the first memory and a plurality of class identifiers for pixel values neighboring the retrieved pixel values.

13 Claims, 5 Drawing Sheets

(56) References Cited

U.S. PATENT DOCUMENTS

| | | | |
|---|---|---|---|
| 6,249,594 B1* | 6/2001 | Hibbard | 382/128 |
| 7,035,467 B2 | 4/2006 | Nicponski | |
| 7,466,465 B2* | 12/2008 | Yamazaki et al. | 358/534 |
| 7,630,550 B2* | 12/2009 | Maroy et al. | 382/173 |
| 7,653,229 B2* | 1/2010 | Kaufhold et al. | 382/131 |
| 7,680,353 B2* | 3/2010 | Jojic et al. | 382/254 |
| 7,706,610 B2* | 4/2010 | Zhang et al. | 382/173 |
| 2002/0028021 A1* | 3/2002 | Foote et al. | 382/224 |
| 2004/0022438 A1* | 2/2004 | Hibbard | 382/199 |
| 2006/0202038 A1 | 9/2006 | Wang et al. | |
| 2007/0206008 A1* | 9/2007 | Kaufman et al. | 345/424 |
| 2008/0292194 A1* | 11/2008 | Schmidt et al. | 382/217 |
| 2009/0274377 A1 | 11/2009 | Kweon et al. | |
| 2009/0276384 A1 | 11/2009 | Harris | |

OTHER PUBLICATIONS

Christopher et al., 3-D Bayesian Ultrasound Breast Image Segmentation Using the EM/MPM Algorithm, IEEE, 2002, ISBN 0-7803-7584-X, pp. 86-89.

* cited by examiner

SYSTEM AND METHOD FOR SEGMENTATION OF THREE-DIMENSIONAL IMAGE DATA

PRIORITY CLAIM

This application claims priority from U.S. Provisional Application No. 61/285,429, which is entitled "System And Method For Three-dimensional Segmentation Of Images Using Field Programmable Gate Arrays" and was filed on Dec. 10, 2009. This application claims further priority from international application number PCT/US2010/059955, which is entitled "System and Method for Segmentation of Three Dimensional Image Data" and was filed on Dec. 10, 2010.

TECHNICAL FIELD

The system and method described below relate to a computing architecture and methods for manipulating image data in general, and more particularly to segmentation of three-dimensional image data.

BACKGROUND

Computational analysis of digital data that correspond to images is of great use in a variety of applications that include medical imaging, artificial intelligence, biometric identification, defect detection in industrial applications, and various other fields. Image data may be two-dimensional, such as image data corresponding to a photograph, or three-dimensional image data. One common example of three-dimensional image data is image data generated by various medical imaging devices including magnetic resonance imaging (MRI) devices. These image data depict physical structures, such as organs of a subject undergoing an MRI, in a series of two-dimensional images taken at various locations along a third axis extending through the subject. The third dimension in three-dimensional image data may also represent a temporal dimension instead of a spatial dimension. For example, a video recording includes a multiple frames, where each frame is a two-dimensional image taken at a particular time. The three-dimensional image data represent multiple frames of the video taken at different times. In either case, the three-dimensional image data are often analyzed as an arrangement of "pixel" values. Each pixel contains image data corresponding to a single position in the three-dimensional space. Depending upon the contents of the image data, each pixel is assigned one or more values, typically numeric values, that represent information collected for the image at the location that the pixel represents.

Many different algorithms and techniques may be applied to analyze and manipulate image data, including three-dimensional image data. One operation to perform on an image is known as "image segmentation." An image segmentation operation groups various pixels in the image together into two or more segments. These pixels are grouped together based on some shared characteristic of the image data in the selected pixels. Various segmentation techniques are known to the art, and one such technique is known as Bayesian Expectation Maximization/Maximization of Posterior Marginals (EM/MPM) segmentation. EM/MPM technique includes two advantages over other segmentation techniques known in the art. First, EM/MPM generates estimates for Gaussian mean and variance for the Gaussian distributions of variations in the measured brightness values of image data corresponding to each pixel. This enables the technique to reduce inaccuracies introduced by noise present in image data. Second, the EM/MPM technique analyzes image data for each pixel with respect to neighboring pixels in the three-dimensional image data. In many images, a particular pixel has a high likelihood to have a brightness value that is the same or similar to the majority of its neighbors, and analyzing the neighbors reduces the effects of single-pixel errors in the image data. The EM/MPM technique performs a statistical cost-minimization technique. The "cost" is the estimated likelihood that a given class identifier for a group of pixels has errors. The EM/MPM technique groups pixels into segments using segment distributions that are determined to have the lowest probability of errors.

While various segmentation techniques are known to the art, many computational challenges limit the use of these techniques in practical applications. In particular, currently available computing systems may take a substantial amount of time to segment image data, particularly three-dimensional image data. As is well known, the size of image data representing a three-dimensional image expands as a cube of the number of pixels in each of the three dimensions. Thus, a single three-dimensional image may grow to be many gigabytes in size, and the sizes of the images will continue to increase at a cubic rate with the development of higher resolution imaging devices. Iterative image analysis techniques such as the MPM portion of the EM/MPM technique require multiple operations to be performed on each pixel in the image data. Standard central processing units (CPUs) known in the art and even parallelized processors such as general-purpose graphical processing units (GPGPUs) may take a substantial amount of time to perform image analysis operations due to the need to exchange large amounts of data with memory, such as random access memory (RAM). Additionally, iterative techniques such as the MPM technique introduce data dependencies that reduce the effectiveness of parallel processing devices since one iteration must complete to provide the data used in the subsequent iteration. The amount of time needed to load and store data and the difficulties in parallelizing image processing operations render conventional computing devices impractical for many time sensitive imaging applications. Consequently, improvements to computing architectures and methods of image analysis that reduce the time needed to perform image analysis operations on image data are beneficial.

SUMMARY

In one embodiment, a system for computing class identifiers for three-dimensional pixel data has been developed. The system comprises a plurality of class identifying processors, and a data grouper operatively connected to a first memory. Each class identifying processor has a plurality of inputs for at least one pixel value and a plurality of class identifiers for pixel values neighboring the at least one pixel value and each class identifying processor is configured to generate a class identifier for the at least one pixel value input with reference to the class identifiers for the neighboring pixel values. The data grouper is configured to retrieve a plurality of pixel values from the first memory and a plurality of class identifiers for pixel values neighboring the retrieved pixel values.

In another embodiment, a method for segmenting three-dimensional image data has been developed. The method includes generating a class identifier for each pixel value in a first slice of three-dimensional image data with reference to a plurality of class identifiers corresponding to pixel values neighboring each pixel value in the first slice, generating a class identifier for each pixel value in a second slice of three-dimensional image data with reference to a plurality of class identifiers corresponding to pixel values neighboring each pixel value in the second slice, and continuing to generate class identifiers for each pixel value in the first slice with reference to at least one class identifier generated for at least one pixel value in the second slice of three-dimensional image data and to generate class identifiers for each pixel value in the second slice with reference to at least one class identifier generated for at least one pixel value in the first slice of three-dimensional image data for a predetermined number of times.

DETAILED DESCRIPTION

Figure 1:
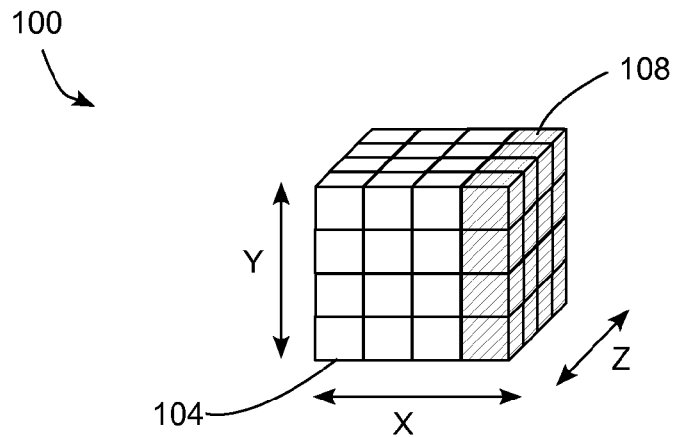
FIG. 1 is a view of pixels arranged in a three-dimensional space.

For a general understanding of the environment for the system and method disclosed herein as well as the details for the system and method, reference is made to the drawings. In the drawings, like reference numerals have been used throughout to designate like elements. As used herein, the term "three-dimensional image" refers to an image that includes two or more two-dimensional images arranged in a three-dimensional space. Each two-dimensional image includes a plurality of pixels arranged along an X axis and a Y axis. Each pixel includes image data, with typical image data for a single pixel being one or more numeric values that indicate image intensity, color levels, or other information generated at the position corresponding to the pixel. The three-dimensional image includes multiple two-dimensional images arranged in a predetermined order along a Z axis. The Z axis may form a three-dimensional image corresponding to a physical space, or may represent a logical dimension such as time where images taken at different times are arranged in a three-dimensional space. As used herein, the terms "image slice" and "slice" refer to a two-dimensional plane of pixels taken through a three-dimensional image along the Z axis. Thus, each slice includes a one-dimensional arrangement of pixels taken from each two-dimensional image in the three-dimensional image data. For reference, FIG. 1 shows an example arrangement of pixels 100 in a three-dimensional space. The forward facing pixels 104 arranged along the X and Y axes are one of the two-dimensional images that form the three-dimensional image data. The shaded pixels 108 extending along the Z axis represent one image slice taken through the three-dimensional image data. The selection of axes and the orientation of image slices depicted in FIG. 1 is merely exemplary of one set of three-dimensional image data, and various different coordinate systems as well as axis and slice orientations may also be used. As used in this document, the words "calculate" and "identify" include the operation of a circuit comprised of hardware, software, or a combination of hardware and software that reaches a result based on one or more measurements of physical relationships with accuracy or precision suitable for a practical application.

Figure 3:
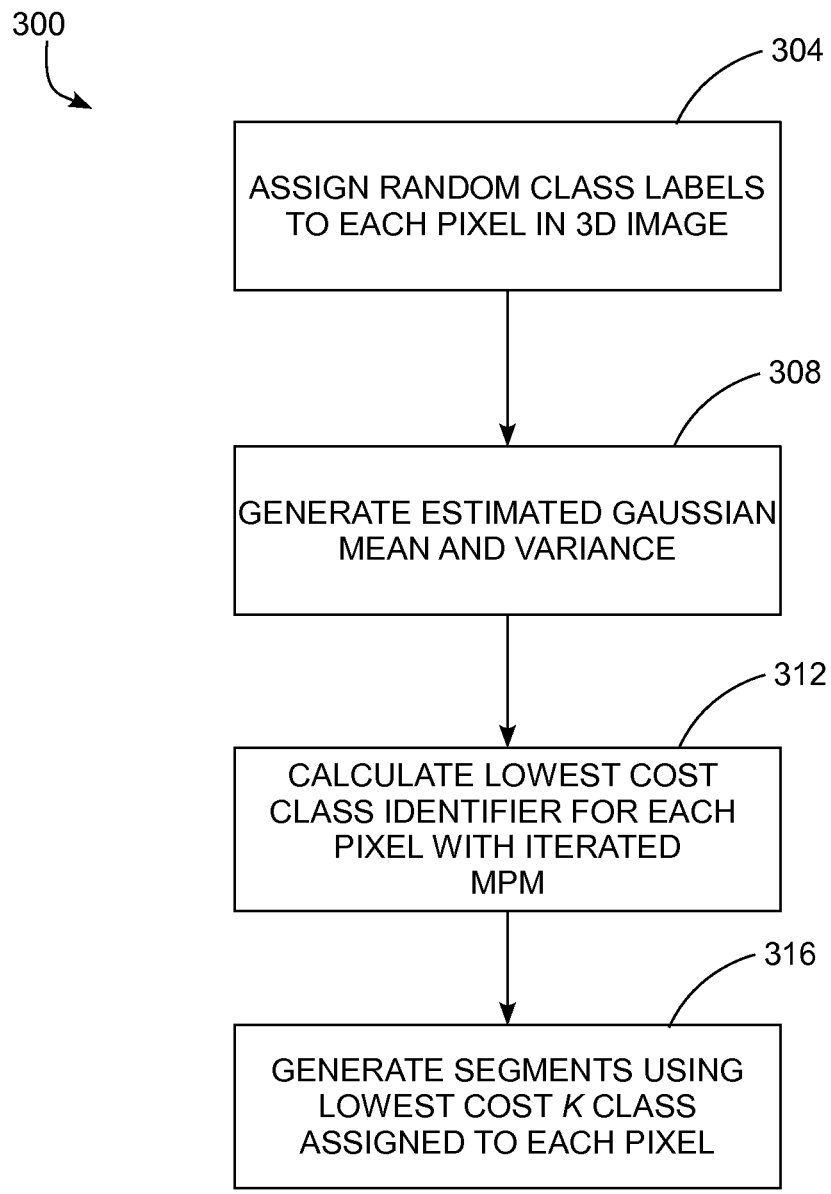
FIG. 3 is a block flow diagram that depicts an EM/MPM image segmentation process.

FIG. 3 depicts a flow diagram of an EM/MPM image segmentation process 300. The end result of process 300 is to assign a class identifier (k) to each pixel in the three-dimensional image data, where pixels sharing a common class identifier are considered to be in a single segment in the image data. The number of classes, and consequently the number of segments, that the image data are divided into is provided a priori to the segmentation process. For example, the number of classes for image segmentation in a three-dimensional MRI image may match the number of tissue types for various organs or bodily structures present in the image data. Process 300 begins by assigning class identifiers to each pixel in the three-dimensional image data (block 304). The class identifiers are selected randomly from the predetermined classes. An initial Expectation Maximization (EM) phase of process 300 generates estimated Gaussian parameters, including mean and variance parameters, that are associated with each class identifier and are used in the MPM calculations (block 308).

Figure 2:
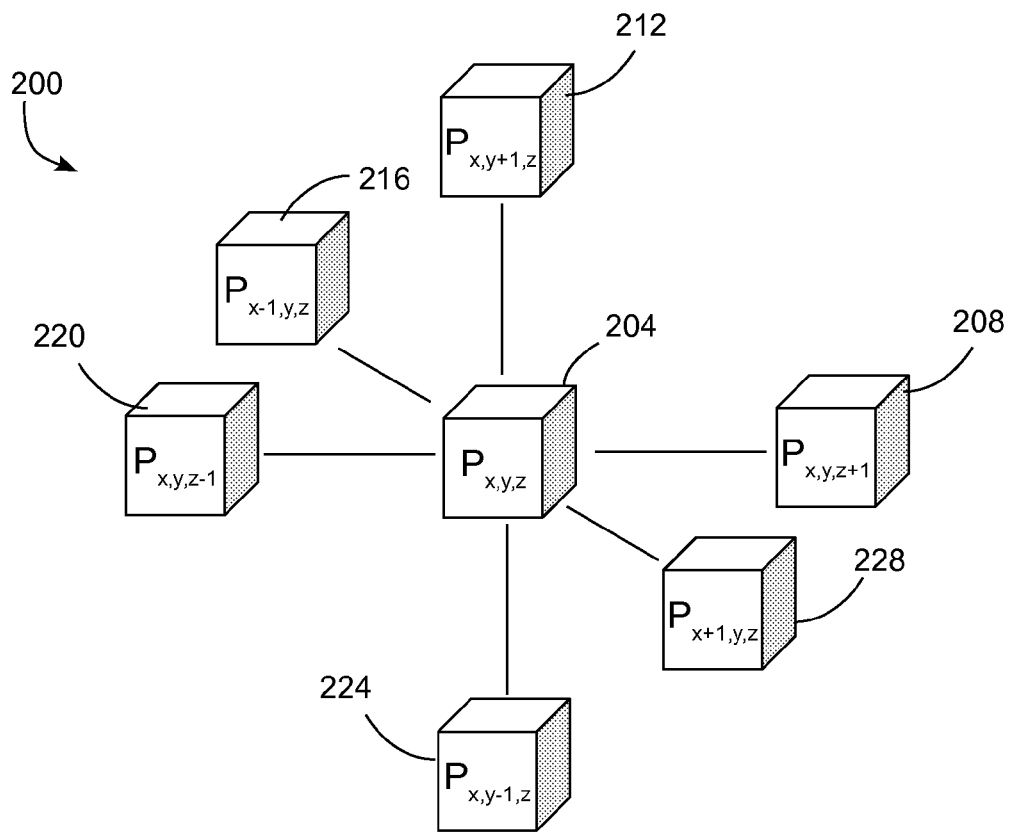
FIG. 2 is a view of a central pixel and six pixels surrounding the central pixel arranged for use in an MPM calculation.

Process 300 uses the assigned class identifiers and estimated parameters to perform a predetermined number of MPM iterations that calculate the class identifiers k having the minimum expected error rate (block 312). The MPM technique uses a Bayesian probability distribution that includes both prior marginal probabilities and later, or posterior, marginal probabilities. The prior marginal probability distribution p(x) is defined using the following equations:

$$p(x) = \frac{1}{z} e^{\left(-\sum_{\{r,s\} \in C} \beta t(x_r, x_s) - \sum_{\{r\} \in C} \gamma_{x_r}\right)}$$

$$t(x_r, x_s) = \begin{pmatrix} 0; x_r = x_s \\ 1; x_r \neq x_s \end{pmatrix}$$

Where C represents the neighbors, or "clique" of pixels $x_r$ surrounding a central pixel $x_s$. FIG. 2 depicts one central pixel $x_s$ 204 with six (6) surrounding pixels $x_r$ 208, 212, 216, 220, 224, and 228. The $x_s$ and $x_r$ data correspond to the class identifiers k associated with the central pixel $x_s$ and neighboring pixels $x_r$. In FIG. 2, neighbor pixels 208, 212, 220, and 224 are in the same slice as central pixel 204, pixel 216 is in the previous slice, and pixel 228 is in the next slice along the X axis. Z is a normalizing value, β is a weighting factor to account for special interaction between the neighboring pixels, and $\gamma_{x_r}$ is a cost factor associated with the class that is currently assigned to each of the neighboring pixels. The MPM maximized posterior distribution is generated using the results of each prior distribution p(x) according to the following equation that is calculated for each segment class identifier k:

$$\text{logpost}(k) = \{-\Sigma_{\{r\} \in C} \gamma_{x_r}\}$$

As seen above, $y_s$ is the numeric value of the original central pixel, and μ and σ are the mean and variance of the class assigned to the central pixel, respectively. The logpost(k) equation generates a probability value associated with the cost of the class k using the mean and variance values associated with the class k. Since the cost represents the likelihood of the identifier k being inaccurate, the MPM techniques selects classes that generate logpost (k) probabilities with the smallest magnitudes. In an alternative embodiment known as simulated annealing, the logpost(k) values are compared to a random variable such as a uniformly random variable and the class is selected in response to the logpost(k) having a greater or smaller magnitude than the random variable. The MPM values are generated using a predetermined number of iterations, as shown in more detail below. In one example embodiment, a the MPM process iterates seven times. The iterations ensure that the calculated expected error value converges to the values having the smallest magnitude for the image data. Process 300 generates segments for the three-dimensional image data by assigning each pixel having the same class identifier k to a common segment (block 316).

Figure 4:
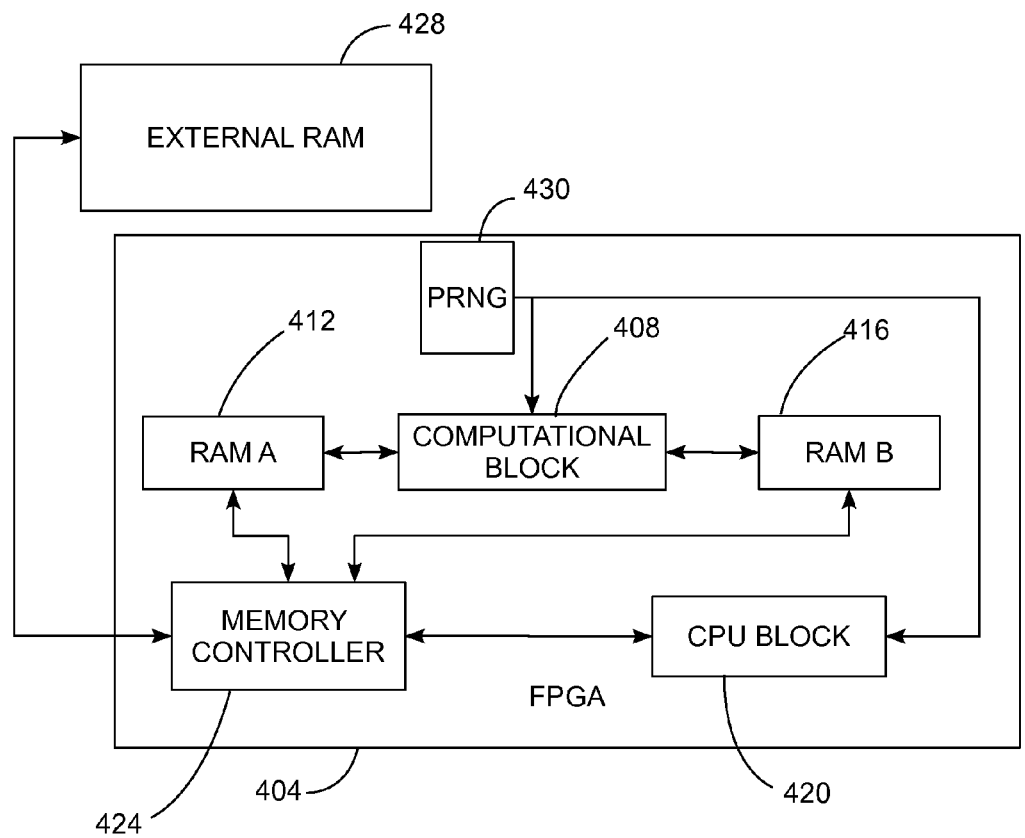
FIG. 4 is a schematic diagram depicting an exemplary computing architecture for processing image data.

FIG. 4 depicts a hardware controller 404 that is configured to perform the EM/MPM segmentation process. Controller 404, embodied in FIG. 4 as a Field Programmable Gate Array (FPGA) is configured with a parallel computational block 408, a first internal memory RAM A 412, second internal memory RAM B 416, a memory controller 424, a CPU block 420, and a pseudo-random number generator 430. An external RAM 428 interfaces with the memory controller 424. RAM A 412 and RAM B 416 are high-speed memory units communicatively coupled to the computational block 408. As seen in more detail below, during iterations of the MPM calculation process, RAM A 412 and RAM B 416 exchange intermediate results for the MPM calculations to enable computational block 408 to calculate MPM results for each pixel. RAM A 412 and RAM B 416 each have the same storage capacity that is sufficient to hold image data for each pixel in a predetermined number of image slices. Computational block 408 is further comprised of a predetermined number of computational units that are configured to perform MPM computations in parallel. Memory controller 424 arbitrates reading and writing of data between the controller 404 and the external RAM 428. External RAM 428 may be a dynamic RAM (DRAM) memory having a sufficient size to hold some or all of the three-dimensional image data, the results from intermediate MPM iterations, and the segmentation classifications for the image data. In a typical embodiment, the external ram 428 is substantially larger than RAM A 412 and RAM B 416, and has a substantially longer access latency than either RAM A 412 or RAM B 416. CPU block 420 is responsible for the EM calculations. Since the EM calculation does not require the parallelism of the MPM calculations, CPU block 420 is implemented as a conventional "soft" CPU formed from various logic gates in the FPGA controller 404. In an alternative embodiment, CPU 420 may be an external processor device that is operatively coupled to the controller 404. Pseudo-random number generator 430 provides random numbers to the computational block 408, CPU block 420, and to other components that utilize random numbers. One use for the pseudo-random number generator 430 is to generate random class identifiers k for each of the pixels in the image data at the start of the MPM process. Another use is to generate random numbers corresponding to a random variable for use in a simulated annealing process to generate class identifiers k from probabilities generated by the logpost(k) calculations. The pixels begin with random class identifiers, and the MPM process modifies the class identifiers to converge on appropriate segment identifications. While FIG. 4 depicts controller 404 as an FPGA, various other hardware configurations including application specific integrated circuit (ASIC) systems may implement the components of FIG. 4.

Figure 5:
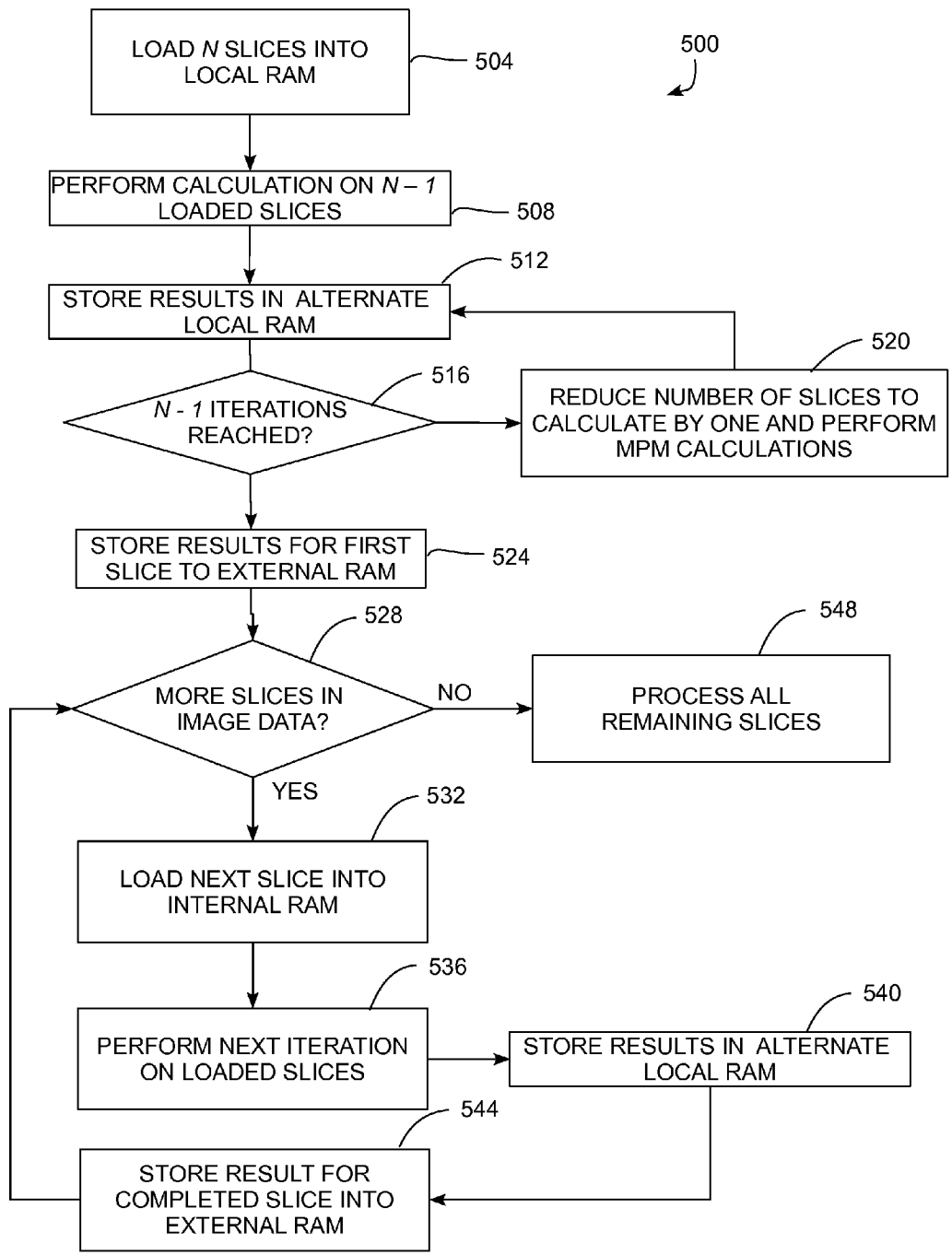
FIG. 5 is a block flow diagram that depicts memory operations for loading image slices during an iterative MPM calculation.

FIG. 5 depicts a process 500 for computing the iterations of the MPM process using the system 400 of FIG. 4. The process 500 begins by loading image data corresponding to a predetermined number of slices N of the three-dimensional image data from the external RAM 428 to one of RAM A 412 or RAM B 414 (block 504). The data structure of each loaded slice includes two data elements corresponding to each pixel. The first element is $y_s$, the image data for the loaded pixel. The second element is $k_{N+1}$, meaning the class identifier for the corresponding pixel in the next slice N+1 that is adjacent to the slice N of the current pixel. For example, the memory values corresponding to a pixel with coordinates 2, 2 in slice N=1 are the $y_s$ numeric value for the image data of the pixel, and the class identifier k for pixel 2, 2 in slice N=2. This arrangement of data items in the external memory simplifies references to adjacent class identifier values k that are used during calculation of the logpost (k) values.

In one embodiment, N is eight (8) so the image data and corresponding class identifiers for eight slices are loaded from the external RAM to the internal memory. The selected slices are adjacent to one another on either the X or Y axes as seen in FIG. 1, and typically the first slice loaded is at one end of either the X or Y axis. Once loaded, the computational block 408 performs N−1 iterative calculations (seven calculations where N=8) on the image data (block 508). The computational block 408 performs the calculations for each iteration in parallel on groups of central pixels and neighbor pixels in each slice. The first iteration block calculates the logpost(k) functions recited above for all of the pixels in the first N−1 slices of the image data. The logpost(k) functions rely on the central pixel $x_s$ as well as all the neighbor pixels $x_r$ as seen in FIG. 2. The logpost(k) function uses the image data $y_s$ for the central pixel, and the class identifiers k for each of the neighbor pixels. Only image data for the central pixel is needed, and the current classification k assigned to the central pixel is not needed. Two of the neighbor pixels 216 and 228 are in the slices immediately before and after the central pixel 204. Note that the classification k for pixel 228, in the next slice from pixel 204, is loaded from memory with the image data $y_s$ for pixel 204 as described above. Thus, in the first iteration, the pixels in slice N cannot be fully calculated since slice N+1 that contains a neighboring pixel has not been loaded into memory. Process block 508 generates a class identifier k for each pixel in the N−1 slices using the results of the logpost(k) calculations as described above with reference to FIG. 3.

The resulting class identifiers and corresponding image data from the first round of calculations are stored in the internal memory other than the internal memory in which the initial image data were stored (block 512). For example, if RAM A 512 stored the image data for the first N slices, then RAM B stores the first intermediate set of class identifiers generated by the MPM calculations. Moving the results between the internal RAM stores in this manner may be referred to as a "ping pong" memory management since results are moved back and forth between RAM A 412 and RAM B 416 in a manner similar to volleying a ping pong ball across a table. The results calculated from the previous round of calculations become the inputs to the next round of calculations. Prior to completing the first N−1 iterations of the MPM process (block 516), each successive calculation iteration reduces the number of slices that are calculated by one (block 520). The number of calculated slices reduces because each of the central pixels $x_s$ needs to calculate logpost(k) using the values of each of the neighboring pixels. In the first round of calculations, this means that slice N cannot be calculated, but is only used as an input to calculating slice N−1. Thus, in the second round, the pixels in slice N−1 cannot be calculated since these pixels need to have the results of the previous round of calculations for all of the neighboring pixels. Slice N−1 lacks neighboring pixels in slice N that went through the previous round of calculations. In each subsequent round, one less slice is calculated until N−1 iterations have been calculated (block 516).

The iterative process produces a series of partially calculated results that are transferred between RAM A 412 and RAM B 416. Using an example where eight (8) slices are loaded and seven (7) iterations are calculated for each slice. The following table depicts the intermediate results where, the $S_{x,y}$ notation denotes that a slice number x has undergone y MPM calculation iterations. Each iteration reads input data from selected from whichever of RAM A and RAM B holds the results of the previous round of calculations. The results are then stored in the remaining RAM. As the number of iterations progresses, the number of slices calculated drops until the first slice has completed seven iterations, seen as $S_{1,7}$. To minimize the amount of data exchanged between RAM A and RAM B, if an iteration generates no new results for a particular slice, then the contents of RAM A and RAM B for the slice remain unchanged. The intermediate calculations for the other slices are retained in the internal memory.

| Prior to Iteration 1 | | After Iteration 1 | | After Iteration 2 | |
| --- | --- | --- | --- | --- | --- |
| RAM A | RAM B | RAM A | RAM B | RAM A | RAM B |
| 0 | 0 | 0 | $S_{1,1}$ | $S_{1,2}$ | $S_{1,1}$ |
| 0 | 0 | 0 | $S_{2,1}$ | $S_{2,2}$ | $S_{2,1}$ |
| 0 | 0 | 0 | $S_{3,1}$ | $S_{3,2}$ | $S_{3,1}$ |
| 0 | 0 | 0 | $S_{4,1}$ | $S_{4,2}$ | $S_{4,1}$ |
| 0 | 0 | 0 | $S_{5,1}$ | $S_{5,2}$ | $S_{5,1}$ |
| 0 | 0 | 0 | $S_{6,1}$ | $S_{6,2}$ | $S_{6,1}$ |
| 0 | 0 | 0 | $S_{7,1}$ | 0 | $S_{7,1}$ |

| After Iteration 3 | | After Iteration 4 | | After Iteration 5 | |
| --- | --- | --- | --- | --- | --- |
| RAM A | RAM B | RAM A | RAM B | RAM A | RAM B |
| $S_{1,2}$ | $S_{1,3}$ | $S_{1,4}$ | $S_{1,3}$ | $S_{1,4}$ | $S_{1,5}$ |
| $S_{2,2}$ | $S_{2,3}$ | $S_{2,4}$ | $S_{2,3}$ | $S_{2,4}$ | $S_{2,5}$ |
| $S_{3,2}$ | $S_{3,3}$ | $S_{3,4}$ | $S_{3,3}$ | $S_{3,4}$ | $S_{3,5}$ |
| $S_{4,2}$ | $S_{4,3}$ | $S_{4,4}$ | $S_{4,3}$ | $S_{4,4}$ | $S_{4,3}$ |
| $S_{5,2}$ | $S_{5,3}$ | $S_{5,2}$ | $S_{5,3}$ | $S_{5,2}$ | $S_{5,3}$ |
| $S_{6,2}$ | $S_{6,1}$ | $S_{6,2}$ | $S_{6,1}$ | $S_{6,2}$ | $S_{6,1}$ |
| 0 | $S_{7,1}$ | 0 | $S_{7,1}$ | 0 | $S_{7,1}$ |

| After Iteration 6 | | After Iteration 7 | |
| --- | --- | --- | --- |
| RAM A | RAM B | RAM A | RAM B |
| $S_{1,6}$ | $S_{1,5}$ | $S_{1,6}$ | $S_{1,7}$ |
| $S_{2,6}$ | $S_{2,5}$ | $S_{2,6}$ | $S_{2,5}$ |
| $S_{3,4}$ | $S_{3,5}$ | $S_{3,4}$ | $S_{3,5}$ |
| $S_{4,4}$ | $S_{4,3}$ | $S_{4,4}$ | $S_{4,3}$ |
| $S_{5,2}$ | $S_{5,3}$ | $S_{5,2}$ | $S_{5,3}$ |
| $S_{6,2}$ | $S_{6,1}$ | $S_{6,2}$ | $S_{6,1}$ |
| 0 | $S_{7,1}$ | 0 | $S_{7,1}$ |

Once the first N−1 iterations have been calculated, only the first slice of image data has gone through the predetermined number of rounds of calculation. The final result for that slice, along with partially calculated values for slices N+1 to N−1 are stored in one of the internal RAMs. The final results for the first slice are stored in the external memory (block 524). As long as there are more slices of image data in the external memory (block 528), the next slice of image data is then loaded into the internal memory to replace the completed slice (block 532). Once loaded into the internal memory, process 500 performs an iteration of the MPM calculation (block 536). This additional iteration completes the iterations for one of the previously partially calculated slices. The intermediate class identifiers are stored in the appropriate local RAM (block 540), and the calculated class identifiers for the completed slice are stored in the external RAM (block 544). For example, when the first slice is completed, the second slice requires a single iteration to produce the complete the MPM calculation. After another slice is loaded into the internal memory, the subsequent iteration completes the second slice. Thus, after the first N−1 iterations are executed, each subsequent iteration produces the calculated MPM result for pixels in an image slice. The controller 404 and process 500 pipeline the MPM calculations with a depth of N−1 since the controller performs one logpost(k) calculation for each of the N−1 image slices that held in RAM A and RAM B for each iteration once the first slice has been calculated.

Process 500 concludes when no more image slices are available in the three-dimensional image data (block 548). The remaining N−1 slices cannot undergo all N−1 iterations of the MPM calculation because there are an insufficient numbers of neighboring image slices to calculate logpost(k) for all iterations. Since these slices are near one edge of the image, they may be discarded, or may have classes assigned based on the number of MPM iterations that were performed. A similar problem also occurs with the first slice loaded into memory since there is no preceding slice to use in performing the MPM calculation. The first slice may have a clique number C of five (5) used in the logpost(k) calculations instead of the usual six (6) to enable the MPM calculations to proceed.

Figure 6:
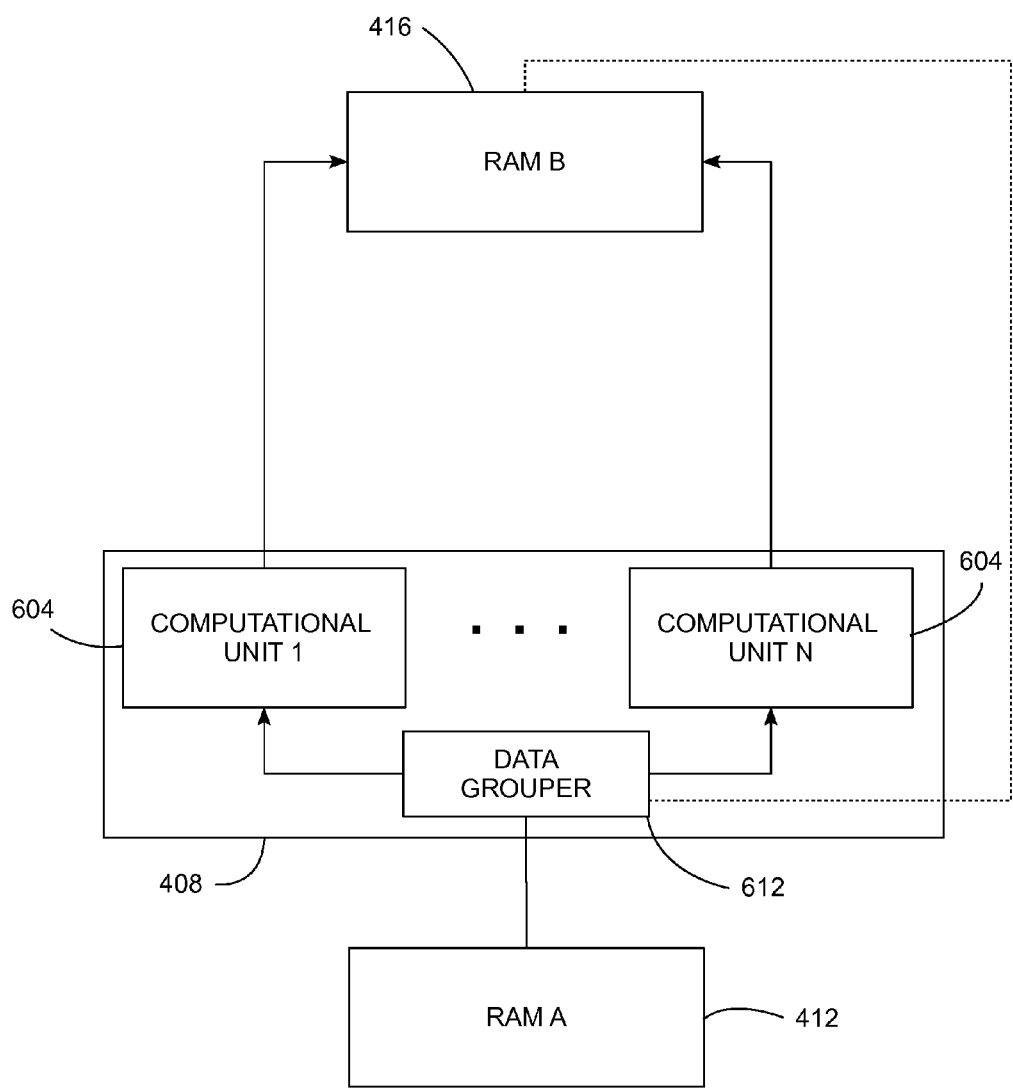
FIG. 6 is a schematic diagram depicting the computational block of FIG. 4 in more detail.

FIG. 6 depicts the computational block 408 in more detail. The computational block 408 includes a plurality of computational units, exemplified here as computational units 604, and a data grouper 612. Typical embodiments of the computational block 408 include eight (8) or sixteen (16) computational units 604, but alternative embodiments may have greater or fewer computational units as needed. Each of the computational units 604 is configured to receive image data for a single central pixel and class identifier data corresponding to the six (6) neighboring pixels. The class identifier data for the neighboring pixels may be intermediate results from a previous iteration of the MPM calculation. Each computational unit 604 is configured to generate a class identifier using the MPM calculations on image data and neighbor class identifiers.

In the configuration of FIG. 6, the image data are read from RAM A 412, and the output of the computation units 604 is stored in RAM B 416, but RAM B 416 may be the source and RAM A 412 may be the destination as well. In the embodiment of FIG. 6, the image data and class identifiers are arranged in RAM A to read out image data for N adjacent pixels, as well as the class identifiers for all of the pixels that neighbor each of the N adjacent pixels. Here N matches the number of computational units 604, so if there are sixteen computational units, sixteen adjacent pixels along with class identifiers for all the neighboring pixels are read. Data grouper 612 is a multiplexing unit that is configured to divide the image data read from RAM A 412 into appropriate groups of data for each of the computational units 604. Data grouper 612 provides each of the computational units 604 with image data $y_s$ for one central pixel, as well as the class identifiers for the six surrounding pixels to enable the computational unit 604 to perform the MPM calculations. Once the computational units 604 have complete a single iteration of the MPM calculation, the computational units write the calculated class identifiers for each pixel to the destination RAM, seen here as RAM B 416. As seen above, RAM A 412 and RAM B 416 alternate once all of the image data have been processed for a single iteration. RAM B 412 is also shown as operatively coupled to the data grouper 612 during operations where RAM B provides source data for the MPM calculations.

The controller 404 and process 500 calculate the class identifier k corresponding to the lowest cost for each pixel in the image data using parallelism and improved memory handling. The plurality of control units 604 enable the controller 404 to calculate an iteration for multiple central pixels in parallel. Since the intermediate results for each iteration are held in the internal RAM A and RAM B during processing, the controller 404 only needs to access the slower external RAM to read in image data and to store the calculated class identifiers for each pixel. Thus, the controller 404 reads only one copy of the image data instead of reading the same image data multiple times during the iterative process. The stored intermediate results enable the computational units 604 to perform iterative calculations in a pipelined manner that leads to efficient utilization of the computational units. Additionally, the intermediate results used in the iterations of the MPM calculations are retained in the internal RAM A and RAM B that provide fast access to the computational units 604. The internal memory arrangement reduces the amount of time that the computational units spend waiting to receiving input data, and improves the utilization of the computational units and the performance of the MPM calculations. Thus, the foregoing embodiments provide a faster and more efficient system for segmenting three-dimensional image data that benefits various fields that analyze the image data.

Those skilled in the art will recognize that numerous modifications can be made to the specific implementations described above. Therefore, the following claims are not to be limited to the specific embodiments illustrated and described above. The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed:

1. A system for computing class identifiers for three-dimensional pixel data comprising:
    a plurality of class identifying processors, each class identifying processor having a plurality of inputs for at least one pixel value and a plurality of class identifiers for pixel values neighboring the at least one pixel value and each class identifying processor being configured to generate a class identifier for the at least one pixel value input with reference to the class identifiers for the neighboring pixel values; and
    a data grouper operatively connected to a first memory and to the plurality of inputs for each class identifying processor in the plurality of class identifying processors, the data grouper being configured to retrieve a plurality of pixel values from the first memory, a plurality of class identifiers for pixel values neighboring each retrieved pixel value from the first memory, and to provide the at least one pixel value and the plurality of class identifiers for the pixel values neighboring the at least one pixel value for each class identifying processor in the plurality of class identifying processors.

2. The system of claim 1, each class identifying processor further comprising:
    a class probability generator configured to generate a probability for each class identifier in a plurality of class identifiers; and
    a class identifier selector configured to select a class identifier corresponding to a probability having a smallest magnitude.

3. The system of claim 1, each class identifying processor further comprising:
    a class probability generator configured to generate a probability for each class identifier in a plurality of class identifiers; and
    a class identifier selector configured to select a class identifier corresponding to the magnitude of the probability with reference to the magnitude of a random number.

4. The system of claim 1 further comprising:
    a random number generator configured to generate random numbers as initial class identifiers for neighboring pixel values.

5. The system of claim 4 wherein the data grouper is operatively connected to the second memory to retrieve a plurality of pixel values and class identifiers generated by the plurality of class identifying processors for input to the class identifying processors.

6. The system of claim 4 wherein the first memory and second memory are configured to be alternatingly connected to the plurality of class identifying processors to receive class identifiers from the class identifying processors for different iterations of class identifier generation and to be alternatingly connected to the data grouper to enable retrieval of pixel values and class identifiers from the first memory and the second memory for different iterations of class identifier generation.

7. The system of claim 1 further comprising:
    a second memory configured to be selectively connected to the plurality of class identifying processors to receive class identifiers generated by the plurality of class identifying processors.

8. The system of claim 1 wherein the plurality of class identifying processors are configured to operate on different at least one pixel values and the corresponding neighboring class identifiers in parallel.

9. The system of claim 1 wherein the class identifying processor is configured with field programmable gate arrays.

10. A method for segmenting three-dimensional image data comprising:
    generating a class identifier for each pixel value in a first slice of three-dimensional image data with reference to a plurality of class identifiers corresponding to pixel values neighboring each pixel value in the first slice;
    generating a class identifier for each pixel value in a second slice of three-dimensional image data with reference to a plurality of class identifiers corresponding to pixel values neighboring each pixel value in the second slice; and
    continuing to generate class identifiers for each pixel value in the first slice with reference to at least one class identifier generated for at least one pixel value in the second slice of three-dimensional image data and to generate class identifiers for each pixel value in the second slice with reference to at least one class identifier generated for at least one pixel value in the first slice of three-dimensional image data for a predetermined number of times.

11. The method of claim 10 further comprising:
    storing each class identifier generated for each pixel in the first slice of three-dimensional image data in an external memory.

12. The method of claim 11 wherein the class identifiers for the first slice of three-dimensional data are stored in a memory in which pixel values for a third slice of three-dimensional image data are stored.

13. The method of claim 10, the generation of the class identifier for a pixel value in the first slice of three-dimensional image data further comprising:
    generating a probability for each class identifier in a plurality of class identifiers for the pixel value in the first slice of three-dimensional image data; and
    selecting one of the class identifiers in the plurality of class identifiers with reference to the generated probabilities for the class identifiers.

* * * * *